UNITED STATES PATENT OFFICE.

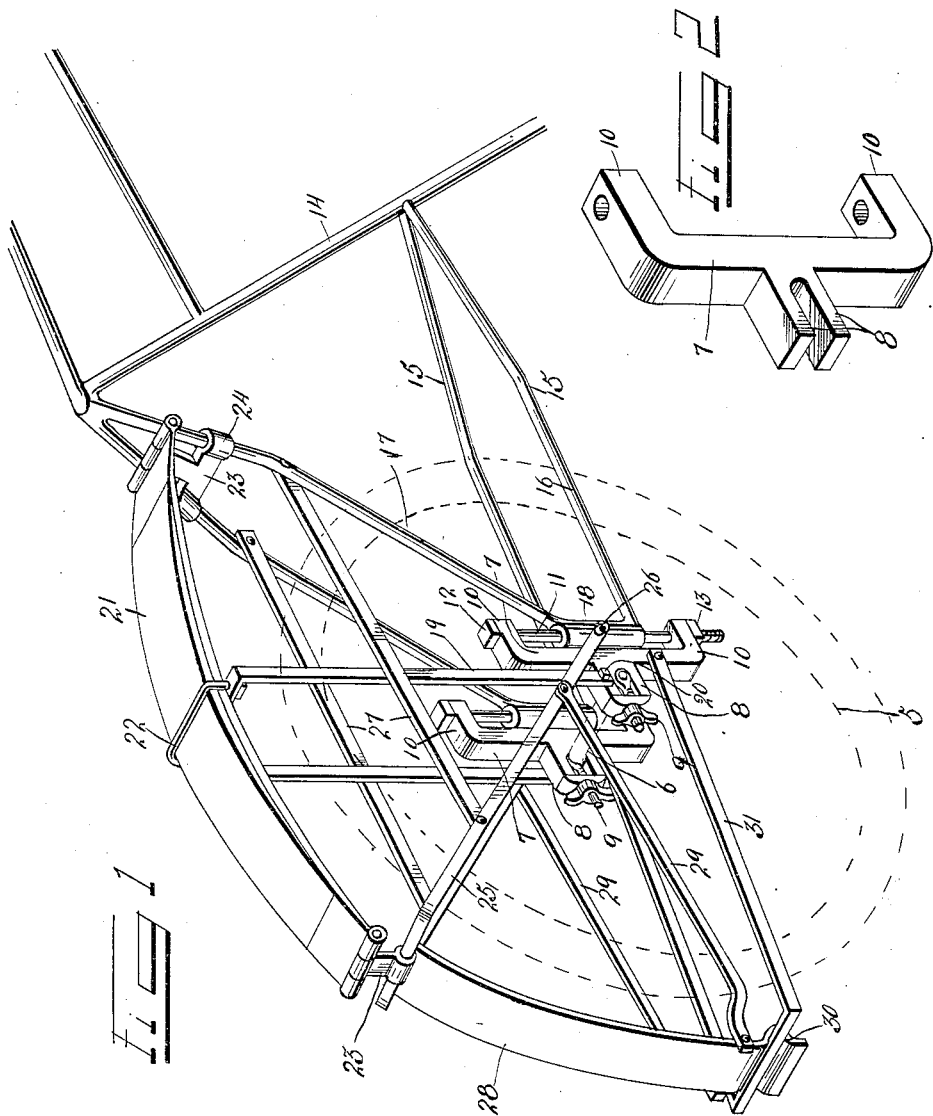

FRANK T. KOEHN, OF TAMPA, KANSAS.

SPRING-FRAME FOR MOTOR-CYCLES.

1,042,563.

Specification of Letters Patent.

Patented Oct. 29, 1912.

Application filed March 16, 1911. Serial No. 614,867.

*To all whom it may concern:*

Be it known that I, FRANK T. KOEHN, a citizen of the United States, residing at Tampa, in the county of Marion, State of Kansas, have invented certain new and useful Improvements in Spring-Frames for Motor-Cycles; and I do hereby declare the following to be a full, clear, and exact description of the invention, such as will enable others skilled in the art to which it appertains to make and use the same.

This invention relates to an improvement in bicycles generally, although the invention resides more particularly to an improvement in motor-cycles.

The principal object is to provide a motor-cycle having resilient means disposed between the rear axle and the frame, whereby all jars incident to the passing of the wheel over rough roads will not be transmitted to the frame of the cycle.

A still further object of the invention is to provide a construction for the purpose described which is composed of a minimum number of parts, is therefore simple in construction and cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a perspective view showing the preferred embodiment of my invention, and Fig. 2 is an enlarged perspective view of one of the yokes.

Like reference numerals designate corresponding parts in all the figures of the drawings.

Referring to the drawings, the invention comprises the usual rear wheel 5 including the axle 6. Disposed on either side of the wheel are yokes 7—7, said yokes being centrally provided with a rearwardly extending integral forked block 8 adapted to receive the ends of the axle. Associated with the block and axle are the usual clamping elements 9. Each yoke 7 is disposed in advance of the axle 6 and includes spaced upper and lower projections 10—10, said projections being respectively provided with alined openings adapted to receive a bolt 11. The upper end of the bolt is provided with a head 12, and associated with the lower end is a lock-nut 13 or any other suitable fastening means.

The invention further comprises a bicycle frame, which includes a post 14 and substantially V-shaped rear fork members 15—15 connected at their ends to said post. The arms 16 and 17 are integrally connected by elongated bearings 18 adapted to receive the slide rods 11, said bearings being of course normally disposed in vertical planes.

Disposed above the axle 6 and straddling the wheel 5, is a U-shaped supporting rod 19, the lower ends thereof being respectively secured to one of the forks 8 of the yoke by means of bolts 20 or other suitable means. The bight of the U extends sufficiently above the wheel and is connected centrally to a leaf-spring 21, by means of a clip 22. This leaf-spring is of a width sufficient to constitute a fender and associated with the opposite ends of the spring are bails 23—23. A clip 24 is secured to the rearwardly inclined arm 17 of the frame, and this clip is suitably connected to the adjacent bail 23. A rearwardly inclined U-shaped supporting rod 25 has its end portions pivotally connected to the bearing 18 by means of bolts 26 or the like. This supporting rod is disposed in rear of the rod 19, and also straddles the wheel 5. The rear bail 23 is suitably connected to the bight of the U. Braces 27—27 have their ends respectively connected to the legs of the rod 25 and to the inclined arm 17 of the frame.

A fender 28 has one end connected to the bight of the rod 25, and has its other end suitably held in spaced relation to the wheel 5 by means of braces 29, said braces being respectively connected at their ends to the fender 28 and to the arm 25. The lower end of the fender 28 is formed with a spring-hook 30 adapted to receive the bight of the U-shaped supporting frame 31, which is pivotally mounted at its ends to the yoke 7.

From the foregoing, it will be observed that when the wheel 5 passes over any obstruction, the wheel will rise against the tension of the leaf-spring 21, and the slide rod 11 will move within the bearing 18 of the frame. It will be observed that the frame is normally held stationary, and that when the axle 6 is elevated as before noted, the central support 19 will exert tension on the leaf-spring 21. As soon as the wheel 5 has cleared the obstruction the spring 21, through the medium of the support 19, will cause the wheel to return to its normal position.

What is claimed is:

1. In a motor-cycle, the combination with a wheel and its axle, of a pair of brackets connected with the ends of the axle and each having a pair of spaced arms, a guide rod connecting the arms, a frame including a fork, the sides of which terminate in blocks slidably mounted upon the guide rods, a U-shaped supporting rod having its lower ends respectively secured to the blocks, a leaf spring connected centrally to the bight of the supporting rod and having one end connected to the fork of the frame, and a second U-shaped supporting rod connected at its bight with the other end of the spring and at its ends to the said block.

2. In a motor-cycle, the combination with a wheel and its axle, of a pair of brackets connected with the ends of the axle and each having a pair of spaced arms, a guide rod connecting the arms, a frame including a fork, the sides of which terminate in blocks slidably mounted upon the guide rods, a U-shaped supporting rod having its lower ends respectively secured to the blocks, a clip secured to the fork of the frame, a bail connected to the clip, a leaf spring centrally secured to the bight of the supporting rod and having one end connected to said bail, a second U-shaped supporting rod havings its ends connected to the blocks, a bail secured to the bight of the last mentioned supporting rod and having engagement with the other end of the leaf spring, and a brace connecting the second mentioned supporting rod with the frame.

3. A motor-cycle comprising in combination, an axle, yokes centrally secured on either end of the axle, said yokes including spaced upper and lower perforated projections, bolts disposed in the openings of the projections, a frame including fork members, the sides of which terminate in blocks adapted for slidable engagement along the bolts, a U-shaped supporting rod connected at its ends to the yoke, a leaf spring centrally connected to the bight of the supporting rod and having one end connected to the frame, and a second U-shaped supporting rod pivotally connected at its ends to the blocks and connected at its bight to the outer end of the leaf spring.

In testimony whereof, I affix my signature, in presence of two witnesses.

FRANK T. KOEHN.

Witnesses:
T. J. PARRY,
J. F. EGGLESTON.

---

Copies of this patent may be obtained for five cents each, by addressing the "Commissioner of Patents, Washington, D. C."